United States Patent Office 3,434,989
Patented Mar. 25, 1969

3,434,989
POLYMERIZATION OF UNSATURATED COMPOUNDS USING AMINO SALTS OF ADDUCTS OF HYDROLYL COPOLYMER ESTERS AS EMULSIFYING AGENTS
Joel Fantl and Frank J. Hahn, Springfield, Mass., Edgar E. Hardy, Brentwood, Mo., and John F. Heaps, Springfield, Mass., assignors to Monsanto Company, St. Louis, Mo., a corporation of Delaware
No Drawing. Filed Sept. 9, 1965, Ser. No. 486,231
Int. Cl. C08f 1/13; B01f 17/34
U.S. Cl. 260—23.7                    13 Claims

ABSTRACT OF THE DISCLOSURE

Disclosed herein is a process for polymerizing vinylidene compounds in the presence of an emulsifying agent which comprises an amino salt of, for example, the maleinized fatty acid or rosin acid ester of an interpolymer of styrene and allyl alcohol. Latices formed by this process are useful as surface coatings.

---

This invention relates to the polymerization of vinylidene compounds. More particularly, this invention relates to the emulsion polymerization of homopolymers and copolymers of vinylidene compounds in granular form.

One of the important industrial processes for polymerizing vinylidene monomers containing the $CH_2=C<$ grouping is the so-called emulsion polymerization process. In this process, the monomers and free radical generating polymerization initiator are stirred vigorously in a large volume of water to distribute the monomers throughout the water in the form of small droplets. The polymerization takes place within the monomer droplets and the large volume of water surrounding the droplets serves to remove the heat liberated in the reaction. From the viewpoint of good heat transfer and the concomitant close control of the polymerization, the emulsion polymerization process is recognized as being nearly an ideal process. In virtually all cases, however, the emulsion of vinylidene monomer in water is not stable in the absence of emulsifying or stabilizing agents.

Notwithstanding the recognized attractive features of emulsion polymerization processes, there are difficulties encountered in employing such processes in the polymerization of vinylidene compounds such as styrene. In part, at least, these shortcomings are due to the difficulty of finding truly satisfactory emulsifying agents for these systems. Many of the emulsifying agents that have been suggested previously have been subject to certain difficulties. For example, many of the emulsifying agents do not give granules of the desired small size. With ionic emulsifying agents, a serious problem arises in the removal of the emulsifying agent from the polymeric material. Certain emulsifying agents are undesirable in that they detract from the stability of the polymeric product. Other emulsifying agents are undesirable in that they are occluded in the polymer and impart a haze thereto.

It is an object of this invention to provide a novel process for the emulsion polymerization of vinylidene compounds.

Another object of this invention is to provide a process for the emulsion polymerization of vinylidene compounds in which novel emulsifying agents are employed.

These and other objects are attained through the provision of a process for polymerizing vinylidene monomers in aqueous media in the presence of an amino salt of an adduct of:
  (a) an alpha, beta ethylenically unsaturated carboxylic compound and (b) an ester of
    (1) at least one unsaturated acid selected from the group consisting of fatty acids, rosin acids and mixtures thereof, and
    (2) a copolymer of a styrene monomer selected from the group consisting of styrene, alpha-alkyl styrenes, ring-substituted styrenes, alpha-alkyl ring-substituted alkyl styrenes, halostyrenes, haloalkyl styrenes and mixtures thereof and an allyl alcohol monomer selected from the group consisting of allyl alcohol, methallyl alcohol, chlorallyl alcohol and mixtures thereof.

The following examples are presented in illustration of this invention and are not intended as limitations thereof.

The following Examples I–II, illustrate the preparation of adduct of (a) alpha, beta ethylenically unsaturated carboxylic compounds and (b) fatty or rosin acid esters of copolymers of styrene monomers and allyl alcohol monomers.

EXAMPLE I

This example illustrates the preparation of a maleinized adduct of a soya fatty acid ester of a styrene/allyl alcohol copolymer:

Part A

Charge 6,080 grams of water-white soya fatty acids, 5,700 grams of a styrene/allyl alcohol copolymer containing about 5.8 weight percent of hydroxyl groups and 400 grams of xylol to a reaction kettle equipped with a stirrer and a trap-condenser-azetrope setup. The reaction mixture is heated according to the following schedule.

| Minutes | Temp., °C. | Comments |
|---|---|---|
| 0 | 27 | All ingredients charged. |
| 78 | 145 | Azeotrope starts. |
| 108 | 170 | 98 ml. water over. |
| 138 | 188 | 187 ml. water over. |
| 168 | 205 | 257 ml. water over. |
| 228 | 232 | 332 ml. water over. |
| 258 | 240 | 351 ml. water over. |
| 318 | 251 | 373 ml. water over. |
| 378 | 253 | 382 ml. water over. |
| 438 | 253 | 385 ml. water over, finis. |

A total of about 42.5 grams of xylol are removed with the water. The resulting product contains about 97% esterified solids by weight, the acid number thereof being about 16.5 as determined by Federal Test Method TT–P–1416 Method 5071.

Part B

Charge 1,030 grams of the product of Part A of this Example I and 82.5 grams of maleic anhydride to a two-liter flask equipped with a stirrer and reflux condenser. Subsequently 1.0 gram of iodine predispersed in 10 ml. of xylol is added to the reaction mixture according to the following schedule:

| Minutes | Temp., °C. | Comments |
|---|---|---|
| 0 | 25 | Ester and maleic anhydride. |
| 15 | 100 | Charge iodine dispersion. |
| 35 | 225 | Some sublimation occurs. |
| 110 | 223 | |
| 140 | 225 | |
| 200 | 228 | Finis. |

The reaction mixture is cooled to about 100° C., 240 grams of butyl Cellosolve are added and the resulting 80% solids solution is strained through nylon cloth. Analysis shows that about 98.9% of the maleic anhydride charged is adducted to the ester; the adduct containing about 8% maleic solids by weight, based upon the initial ester solids.

EXAMPLE II

This example illustrates the preparation of a maleinized adduct of an oleic acid ester of a styrene/allyl alcohol copolymer:

Example I is repeated with substantially equivalent results substituting oleic acid for the soya fatty acids used therein.

The following Examples III–VII, illustrate the preparation of granular polymerization products of vinylidene compounds according to the principles of this invention.

EXAMPLE III

This example illustrates the emulsion polymerization of styrene using the maleinized adduct of the oleic acid ester of styrene-allyl alcohol copolymer prepared in Example II:

Charge 73 grams (solids basis) of the maleinized adduct of the oleic acid ester of styrene/allyl alcohol copolymer prepared in Example II, 17 grams of 50 weight percent solution of dimethylethanolamine in a 75/25 by weight mixture of water/propanol and 145 grams of further 75/25 water/propanol mixture to a glass lined, stirred reactor and heat at 60° C. until the adduct has dissolved. Four hundred grams of water and 1 gram of sodium bisulfite are then added and the charge is brought to 60° C. The atmosphere in the reaction vessel is swept free of oxygen with nitrogen and thereafter a mixture of 280 grams of styrene, 80 ml. of water and 2 grams of potassium persulfate is slowly added over a 90 minute period while maintaining the polymerization system at about 60° C. After the styrene has been fully charged, the system is quickly brought to about 80° C. and maintained there-at until a total polymerization time of 135 minutes has elapsed. The resulting lattice emulsion has a pH of about 9.2 and contains about 35% solids by weight. The granular polystyrene is obtained in substantially quantitative yield in the form of small spherical beads having an average diameter of less than about 0.1 micron.

EXAMPLE IV

This example illustrates the emulsion polymerization of styrene, acrylonitrile and 2-ethylhexyl acrylate using the maleinized adduct of the soya fatty acid ester of styrene/allyl alcohol copolymer prepared in Example I:

Mix 1,150 grams of the maleinized adduct of the soya fatty acid ester of styrene/allyl alcohol copolymer prepared in Example I, 135 grams of dimethylethanolamine and 2,415 grams of a 75/25 by weight water/propanol mixture. Into a glass lined stirred reactor are then charged 235 grams of the above adduct mix, 405 grams of water and 1 gram of sodium bisulfite. The atmosphere in the reaction vessel is swept free of oxygen with nitrogen and the following mixtures are then added according to the following schedule while maintaining the reaction system at about 60° C.

Catalyst solution.—80 ml. water, 2 grams potassium persulfate
Monomer mixture A.—44 ml. styrene, 20 ml. acrylonitrile
Monomer mixture B.—124 ml. styrene, 126 ml. 2-ethylexyl acrylate The catalyst solution is slowly charged at a constant rate of 0.4 ml. per minute. Five minutes after beginning the charge of the catalyst solution, addition of monomer mixture A is also begun at a constant rate of 2 ml. per minute. When all of monomer mixture A has been charged (ca. 32 minutes after start of charge thereof), addition of monomer mixture B is also begun at a constant rate of 4 ml. per minute while containing the addition of the catalyst solution at an accelerated rate of 0.8 ml. per minute. Circa 62 minutes later all of monomer mixture A and B have been added and the remaining catalyst solution (ca. 16 ml.) is added at once. The reaction system is quickly brought to about 80° C. and maintained thereat until a total polymerization time of 135 minutes from the start of addition of monomer mixture A has elapsed. The resulting lattice emulsion contains about 34% solids by weight of a granular terpolymer of styrene/acrylonitrile/2-ethylhexyl acrylate obtained in substantially quantitative yield in the form of small spherical beads having an average diameter of less than about 0.1 micron.

EXAMPLE V

This example illustrates the emulsion polymerization of styrene, acrylonitrile and dibutyl fumarate using the maleinized adduct of the soya fatty acid ester of styrene/allyl alcohol copolymer prepared in Example I:

Mix 1,150 grams of the maleinized adduct of the soya fatty acid ester of styrene/allyl alcohol copolymer prepared in Example I, 135 grams of dimethylethanolamine and 2,415 grams of a 75/25 by weight water/propanol mixture. Into a glass lined, stirred reactor are then charged 135 grams of the above adduct mix, 240 grams of water and 0.5 grams of sodium bisulfite. The atmosphere in the reaction vessel is swept free of oxygen with nitrogen and the following mixtures are then added according to the following schedule while maintaining the reaction system at about 60° C.

Catalyst solution.—40 ml. water, 1 gram potassium persulfate
Monomer mixtures.—95 ml. styrene, 12.5 ml. acrylonitrile, 65 ml. dibutyl fumarate The catalyst solution is slowly charged at a constant rate of 0.3 ml. per minute. Five minutes after beginning the charge of the catalyst solution, addition of the monomer mixture is also begun at a constant rate of 1.8 ml. per minute. Circa 95 minutes later all of the monomer mixture has been added and the remaining catalyst solution (ca. 10 ml.) is added at once. The reaction system is quickly brought to about 80° C. and maintained thereat until a total polymerization time of 130 minutes from the start of addition of the monomer mixture has elapsed. The resulting lattice emulsion contains about 32% solids by weight of a granular terpolymer of styrene/acrylonitrile/dibutyl fumarate obtained in substantially quantitative yield in the form of small spherical beads having an average diameter of less than about 0.1 micron.

EXAMPLE VI

This example illustrates emulsion polymerization of styrene and butadiene using the maleinized adduct of the soya fatty acid ester of styrene/allyl alcohol copolymer prepared in Example I:

Mix 50 grams of the maleinized adduct of the soya fatty acid ester of styrene/allyl alcohol copolymer prepared in Example I, 17.5 grams of ammonium hydroxide dissolved in 10 grams of a 75/25 water/propanol mixture and an additional 95 grams of the 75/25 water/propanol mixture. Into a glasslined, stirred pressure reactor are then charged 117 grams of the above mix, 203 grams of water and 0.7 grams of tetrasodium pyrophosphate and mix for 1 minute to insure uniform mixture. The atmosphere in the reaction vessel is swept free of oxygen with nitrogen, 84 grams of styrene and 56 grams of butadiene are added, and the reaction vessel is sealed. 0.52 grams of ammonium persulfate in 10 grams of a 75/25 water/propanol mixture are then injected into the reaction vessel and the system is heated and maintained at about 50° C. for 16 hours. The resulting lattice emulsion has a pH of about 9.4 and contains about 35% solids by weight. The granular polystyrene/butadiene copolymer is obtained in substantially quantitative yield in the form of small spherical beads having an average diameter of less than about 0.1 micron.

EXAMPLE VII

This example illustrates the emulsion copolymerization of ethylene and vinyl chloride using the maleinized adduct of soya fatty acid ester of styrene/allyl alcohol copolymer prepared in Example I.

| | | |
|---|---|---|
| Dodecylbenzene sodium sulfonate | grams | 20 |
| Adduct of Example I (ethanolamine salt) | do | 10 |
| Sodium bicarbonate | millimoles | 200 |
| Tetrasodium pyrophosphate | do | 40 |
| Potassium persulfate | do | 80 |
| Sodium formaldehyde sulfoxylate | do | 52 |

The above ingredients are combined in a glass lined stirred pressure reactor and brought with water to a total weight of 1,600 grams. The atmosphere in the reaction vessel is swept free of oxygen with nitrogen and then sealed. 638 grams of ethylene and 448 grams of vinyl chloride are injected into the reaction vessel and the reaction mixture is heated and maintained at about 30° C. and 2,000 p.s.i. for a total of 220 minutes and continuous agitation. During this reaction period a total of 642 grams of vinyl chloride are further added incrementally to maintain the 2,000 p.s.i. pressure. The resulting latice emulsion contains 895 grams of an ethylene/vinyl chloride copolymer, analyzing about 75.6 weight percent vinyl chloride, in the form of small spherical beads.

The emulsifying agents

The emulsifying agents employed in the practice of this invention are amino salts of adducts of:
(a) alpha, beta ethylenically unsaturated carboxylic compounds and
(b) esters of
  (1) at least one unsaturated acid selected from the group consisting of fatty acids, rosin acids and mixtures thereof, and
  (2) a copolymer of a styrene monomer selected from the group consisting of styrene, alpha-alkyl styrenes, ring-substituted styrenes, alpha-alkyl ring-substituted alkyl styrenes, halo-styrenes, haloalkyl styrenes and mixtures thereof and an allyl alcohol monomer selected from the group consisting of allyl alcohol, methallyl alcohol, chlorallyl alcohol and mixtures thereof.

The styrene/allyl alcohol copolymer will, in actual practice, most probably be a copolymer of styrene and allyl alcohol due to the ready availability of these monomers. However, it has been found that the styrene moiety present in the copolymers employed in the examples may be replaced with equivalent results being obtained, by substituted styrenes such as, for example, alpha-alkyl styrenes, e.g., alpha-methyl styrene, alpha-ethyl styrene, etc.; ring-substituted alkyl styrenes, e.g., ortho-, meta- and para-methyl, ethyl, butyl, etc., styrenes, 2,3- and 2,4- dimethyl and diethyl styrenes; halo styrenes, e.g., mono-, di- and trichlorostyrenes, alpha-chloro styrene, 2,4-dibromostyrene, etc.; haloalkyl styrenes, e.g., 4-chloro-alphamethyl styrene, 2-bromo-4-methyl styrene, etc. Mixtures of such styrene monomers may be present in combined form in the copolymer employed, if desired. Similarly, the allyl alcohol moiety present in the copolymers employed in the examples may be replaced, with equivalent results being obtained, by substituted allyl alcohols such as, for example, methallyl and chlorallyl alcohols. Mixtures of such allylic monomers may be present in combined form in the copolymers employed, if desired.

While the prior art, as exemplified by U.S. Patents 2,588,890, 2,630,430, 2,894,938 and 2,940,946, quite adequately describes these styrene/allyl alcohol copolymers and methods for their preparation, in a preferred embodiment copolymers containing from about 5.0 to 8.0 weight percent of hydroxyl groups have been found to provide superior results and are employed. In a further preferred embodiment, the relatively homogeneous copolymers prepared as taught in U.S. Patent 2,940,946 are employed.

The fatty acids or rosin acids with which the styrene/allyl alcohol copolymer are esterified preferably has an unsaturation as measured by iodine number using the ASTM D1467–57T method of from about 50 to 220 and, more preferably, about 125 to 200. Thus, whether the acid employed be a relatively pure unsaturated acid or a mixture of acids such as are commercially available, e.g., derived from natural vegetable, protein or animal oils, the total acids employed would have an iodine number as above limited. It is, therefore, apparent that virtually any saturated or unsaturated rosin acid, e.g., abietic acid, fatty acid or commercial mixture of fatty acids and/or rosin acids may be employed with the sole proviso that if the mass chosen does not have an iodine number within the designated range, or of a predetermined desired value, a sufficient proportion of compensating acid should be added to adjust the iodine number to the desired level.

In a preferred embodiment, fatty acids are employed. Still more preferably, the proportions of saturated fatty acids and of conjugated unsaturated fatty acids in the total fatty acid employed are kept below 35 weight percent of each; the best results being obtained maintaining the proportion of saturated and conjugated unsaturated fatty acids below 10 weight percent of each type. In this embodiment, nonfatty monbasic acids such as, for example, rosin acids, benzoic acids, etc., may be substituted for fatty acids in proportions not exceeding 20% of the total acids used.

Within the foregoing frame of reference, it is therefore obvious that one may employ unsaturated fatty acids such as, for example, $\Delta^{9,10}$-decylenic acid, $\Delta^{9,10}$-dodecylenic acid, palmitoleic acid, oleic acid, ricinoleic acid, petroselenic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc., mixtures of unsaturated fatty acids as obtained by the hydrolysis of drying and semi-drying oils such as, for example, acorn oil, beechnut oil, brazil nut oil, chaulmoogra oil, corn oil, cottonseed oil, croton oil, hemp seed oil, linseed oil, oiticia oil, perilla oil, poppy seed oil, sesame oil, soybean oil, safflower oil, sunflower oil, tall oil, tung oil, menhaden oil, sardine oil, walnut oil, dehydrated castor oil, etc.; saturated fatty acids such as, for example, capric acid, lauric acid, myristic acid, palmitic acid, stearic acid, arachidic acid, behenic lignoceric acid, etc.; and mixtures of saturated fatty acids as obtained by the hydrolysis of nondrying oils such as, for example, coconut oil, babassu oil, palm oil, olive oil, castor oil, peanut oil, rape oil, etc.

Finally, with regard to the characterization of the fatty or rosin acid esters of styrene/allyl alcohol copolymers which may be employed, it has been found that the presence of more than a small amount of free hydroxyl groups in the esterified copolymer interferes with proper adduction of the unsaturated carboxylic acid, resulting in a competing esterification reaction with said carboxylic acid and in permature gelation of the reaction system. On the other hand, the presence of significant amounts of free fatty or rosin acid in the final adducted product has been found to cause foaming and foam interfering concentrations of soap during the subsequent formulation of, e.g., water-based, surface coating compositions. Therefore, it has been found that from about 0.75 to 1.25, and more preferably from about 0.95 to 1.1, carboxyl equivalents of the fatty or rosin acid should be employed per hydroxyl equivalent of the styrene/allyl alcohol copolymer. When linseed acids, soya acids or other fatty acids of substantially equivalent acid number are used in conjunction with a styrene/allyl alcohol copolymer containing about 5.0 to 8.0 weight percent hydroxyl groups, esters prepared using about 38 to 62 weight percent of fatty acid and, correspondingly, about 62 to 38 weight percent of styrene/allyl alcohol copolymer have been found to eventuate in superior surface coating compositions.

During the preparation of the fatty or rosin acid esters of the styrene/allyl alcohol copolymers, a small amount of a hydrocarbon solvent is usually employed to maintain a flowable reaction system. In many instances, substantially more solvent may be employed without seriously affecting the practice of this invention. In commercial practice, it is most probable that the fabricator of the surface coating compositions will prepare his own fatty acid esters and then form the adduct as hereinafter taught. However, the inventive concept of this invention permits that one may obtain and use commercially available, e.g., fatty acid esters of styrene/allyl alcohol copolymers meeting the foregoing requirements as the raw material of his process.

Any ethylenically unsaturated carboxylic acid, anhydride, or a partial ester thereof containing the structure

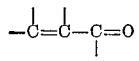

may be employed in forming the adducts. Anhydrides are preferably employed. However, to avoid redundancy the term "acid" as hereinafter employed in naming specific examples of useful compounds and in otherwise referring to these compounds shall be understood to include and refer to the corresponding anhydride where possible as well as to the partial esters. Thus, in place of the maleic and fumaric acids employed in the examples, one may employ, with equivalent results, monocarboxylic acids, such as, for example, acrylic acid, methacrylic acid, crotonic acid, isocrotonic acid, vinyl acetic acid, ethacrylic acid, dimethyl acrylic acid, tetracrylic acid, angelic acid, tiglic acid, etc., and polycarboxylic acids such as, for example, itaconic acid, citraconic acid, chloramaleic acid, mesaconic acid, aconitic acid, etc.

As aforesaid, in the case of polycarboxylic acids, the partial, e.g., not exceeding one-half, esters thereof with 1–10 carbon atom alcohols may be employed. Examples thereof include mono-methyl maleate, mono-butyl fumarate, mono-butyl maleate, mono-decyl maleate, monobenzyl maleate, etc.

In preparing the adducts, up to a stoichiometeric proportion of the ethylenically unsaturated carboxylic acid with respect to the esterified styrene/allyl alcohol copolymer is employed, equating the unsaturation in the esterified copolymer as measured by the total iodine number thereof, using in this instance ASTM D1541–58T, with the unsaturation in the ethylenically unsaturated carboxylic acid.

The esterified styrene/allyl alcohol copolymer and the ethylenically unsaturated carboxylic acid are combined in a suitable reaction vessel, preferably equipped with a reflux condenser and means for charging materials during reaction. Adduction is effected at temperatures of from about 50° C. to reflux, and more preferably at from about 100° C. to reflux, until substantially all of the ethylenically unsaturated carboxylic compound has been consumed. The presence of an organic solvent during adduction does not interfere except insofar as the particular solvent employed may not, at the reaction pressure employed, permit the reaction temperature to approach reaction conditions or maintain the reactive materials in a physical state permitting effective coreaction.

Although not necessary, it has been found advantageous to effect the adduction in the presence of a small proportion of iodine; for example, up to about 2 weight percent, based upon the total weight of esterified styrene/allyl alcohol copolymer and ethylenically unsaturated carboxylic acid. The function of the iodine during adduction is to lighten the color of the resulting product and also to depress the molecular weight of the product so as to retain a lower viscosity and avoid gelation. This function is unusual in this art since the normal use of iodine is to catalyze reaction with conjugated unsaturation. In these systems, however, there may be very little, if any, conjugation. Thus, while no iodine need be employed, it has been found that the adducted product contains a level of color which may be found to be objectionable in certain instances. More importantly, however, when iodine is not used, the adduction reaction should be more carefully controlled so as to avoid gelation. The use of too much iodine, on the other hand, has been found to decrease the chemical, or hydrolysis, resistance of films prepared from the adducted product. Generally, the iodine is predispersed in a solvent and charged to the reaction system along with the ethylenically unsaturated carboxylic acid, but may be added during the adduction reaction, if desired, with some sacrifice in efficacy.

As heretofore mentioned, the adduction reaction may be effected in the optional presence of a nonreactive organic solvent. Generally, up to 10% by weight, based upon total solids, of an organic solvent will provide a suitable reaction mixture. However, as aforesaid, significantly more solvent may be employed, if desired. Virtually any of the conventional nonreactive solvents, e.g., varsol, xylol, toluene, isobutyl ketone, etc., may be employed.

Prior to use the adduct is converted to the amino salt through the addition of up to a stoichiometrically equivalent proportion of an amino compound such as, for example, ammonia; a mono-, di- or tri- alkyl amine such as, e.g., methylamine, ethylamine, diethylamine, triethylamine, n-propylamine, n-butylamine, tri-n-butylamine, n-hexylamine, etc.; a mono- di- or tri-alkanol amine such as ethanolamine, diethanolamine, triethanolamine, 2-methyl-2-amino propylene, etc.; morpholine; etc.

The Polymerization

The adduct is dispersed in the aqueous phase and made water-soluble by addition of the ammonia or amine to convert the adduct to the amino salt. If desired, an auxiliary emulsifying agent can be used. Usually only a small concentration of the emulsifying agent of this invention is necessary, e.g., 0.02 to 1.0% and more particularly 0.05 to 0.5% based on the weight of water used. However, this invention is not limited in the proportion of emulsifying agent since more than the above upper limit can be used without adverse affect. Rather, the amount of emulsifying agent to be used in a particular polymerization system depends on many factors known to those skilled in the art and by controlling the concentration of dispersing agent under a given set of polymerization conditions it is possible to obtain the polymer in a controlled particle size.

Due to the fact that the emulsifying agents of this invention are amino salts of the adducted ester of the styrene/allyl alcohol copolymer the polymerization systems generally have a pH of 7 to 10 or even higher. Conventional additives for emulsion polymerization of vinylidene monomers may be used as required or desired. The polymerization itself may be conducted along conventional lines, adding the monomer(s) in a variety of manners according to the product desired. For example, all monomer(s) may be added initially or if desired all or a portion thereof may be added continuously or incrementally during the polymerization. Grafts may be prepared by first polymerizing one monomer or combination thereof and then polymerizing a different monomer or combination thereof according to established techniques. Similarly, conventional catalysts may be used adding them either initially or in total or part, continuously or incrementally during the course of the polymerization. In short, this invention contemplates the use of the dispersing agents of this invention in emulsion polymerizations of all kinds known to the art.

Typical monomers which may be polymerized in this manner either alone or in conjunction with other vinylidene monomers copolymerizable therewith include, for example, vinylidene aromatic monomers such as styrene, alpha-alkyl styrenes such as alpha-methyl-styrene, alphamethylvinyl toluene, alpha-methyl dialkylstryenes, etc., ring-substituted alkyl styrenes such as vinyl toluenes, o-ethylstyrene, p-ethylstyrene, 2,4-dimethyl styrene, etc., ring-substituted halostyrenes such as o-chlorostyrene, p-bromostyrene, 2,4-dichlorostyrene, 2-chloro-4-methyl styrene, 2,6-dichloro-4-methyl styrene, etc., vinyl naphthalene, vinyl anthracene, divinyl benzene, etc.; conjugated 1,3-dienes such as butadiene, isoprene, chloroprene, etc.; alpha,beta-ethylenically unsaturated acids and derivatives thereof such as maleic acid or anhydride, fumaric acid, itaconic acid, acrylic acid, methacrylic acid, ethacrylic acid, methyl acrylate, ethyl acrylate, butyl acrylate, 2-ethylhexyl acrylate, etc., and the corresponding esters of methacrylic, maleic or fumaric acids, acrylamine, methacrylamide, acrylonitrile, methacrylonitrile, etc.; olefins such as ethylene, propylene, butylene, isobutylene, etc.; vinyl halides such as vinyl chloride, vinyl bromide, etc.; vinylidene chloride; vinyl ketones such as methyl vinyl ketone, methyl allyl ketone, etc.; vinyl ethers such as methyl vinyl ether, phenyl vinyl ether, etc.; etc.

The lattices thus produced are useful as surface coating compositions, e.g., floor waxes, paints, etc. When formulating paints colorants are dispersed in the latex and a thickener is optionally added. An unexpected feature of this invention lies in the discovery that glossy paints can be prepared from the lattices of this invention; all that is required for gloss being (1) complete compatability of the paint formulation, (2) an average polymer particle size of 0.05 micron or less, and (3) the presence of little or no thickener. The following is an example of a typical gloss paint formulation:

EXAMPLE VIII

Add 200 grams of titanium dioxide to a mixture of 560 grams of the emulsion of Example IV and 85 grams of propylene glycol in a ball mill to disperse the titanium dioxide pigment. Mix in another 130 grams of propylene glycol and a solution of 5 ml. of hydroxyethyl cellulose in 20 ml. of water. A 6 mil film of the resulting paint on clean glass is tested according to Federal Test Method 6142 for its resistance to water and no deformation of the film occurs after 1,000 strokes. The gloss of this same film according to ASTM D523–62T measures 85% reflectance at 60°.

Surface coating compositions of this invention, whether glossy or flat, are characterized by resistance to water and alkali, lack of tackiness and excellent recoatability.

It is obvious that many variations may be made in the products and processes herein set forth without departing from the spirit and scope of this invention.

What is claimed is:

1. In a process for preparing granular polymerization products of vinylidene compounds, the improvement which comprises polymerizing in aqueous dispersion a polymerizable material selected from the class consisting of vinylidene monomers and mixtures thereof with at least one dissimilar vinylidene monomer in the presence of a dispersing agent comprising an amino salt of an adduct of:
   (a) an alpha,beta ethylenically unsaturated carboxylic compound and
   (b) an ester of
      (1) at least one unsaturated acid selected from the group consisting of fatty acids, rosin acids and mixtures thereof, and
      (2) a copolymer of a styrene monomer selected from the group consisting of styrene, alpha-alkyl styrenes, ring-substituted alkyl styrenes, alpha-alkyl ring-substituted alkyl styrenes, halostyrenes, haloalkyl styrenes and mixtures thereof and an allyl alcohol monomer selected from the group consisting of allyl alcohol, methallyl alcohol, chloroallyl alcohol and mixtures thereof; wherein said copolymer before esterification has a hydroxyl group content of from about 5.0 to 8.0% by weight, said hydroxyl groups, in the the ester, having been esterified with at least about 0.75 carboxyl equivalents of the unsaturated acid of (b) (1) per hydroxyl equivalent of the copolymer.

2. A process as in claim 1 wherein the polymerizable material is styrene.

3. A process as in claim 1 wherein the polymerizable material is a mixture of styrene, acrylonitrile and 2-ethylhexyl acrylate.

4. A process as in claim 1 wherein the polymerizable material is a mixture of styrene, acrylonitrile and dibutyl fumarate.

5. A process as in claim 1 wherein the polymerizable material is a mixture of styrene and butadiene.

6. A process as in claim 1 wherein the polymerizable material is a mixture of ethylene and vinyl chloride.

7. A process as in claim 1 wherein the alpha,beta-ethylenically unsaturated carboxylic compound is maleic acid or the anhydride thereof.

8. A process as in claim 7 wherein the unsaturated acids are soya fatty acids.

9. A process as in claim 8 wherein the polymerizable material is a mixture of styrene, acrylonitrile and 2-ethylhexyl acrylate.

10. A process as in claim 8 wherein the polymerizable material is a mixture of styrene, acrylonitrile and dibutyl fumarate.

11. A process as in claim 8 wherein the polymerizable material is a mixture of styrene and butadiene.

12. A process as in claim 8 wherein the polymerizable material is a mixture of ethylene and vinyl chloride.

13. An emulsified surface coating composition comprising discrete particles of a vinylidene polymer and as emulsifying agent as amino salt of an adduct of:
   (a) an alpha,beta ethylenically unsaturated carboxylic compound and
   (b) an ester of
      (1) at least one unsaturated acid selected from the group consisting of fatty acids, rosin acids and mixtures thereof, and
      (2) a copolymer of a styrene monomer selected from the group consisting of styrene, alpha-alkyl styrenes, ring-substituted alkyl styrenes, alpha-alkyl ring-substituted alkyl styrenes, halostyrenes, haloalkyl styrenes and mixtures thereof and an allyl alcohol monomer selected from the group consisting of allyl alcohol, methallyl alcohol, chloroallyl alcohol and mixtures thereof; wherein said copolymer before esterification has a hydroxyl group content of from about 5.0 to 8.0% by weight, said hydroxyl groups, in the ester, having been esterified with at least about 0.75 carboxyl equivalents of the unsaturated acid of (b) (1) per hydroxyl equivalent of the copolymer.

References Cited

UNITED STATES PATENTS

| | | | |
|---|---|---|---|
| 2,941,968 | 6/1960 | McKenna | 260—23 |
| 2,992,197 | 7/1961 | Boller | 260—22 |
| 3,251,790 | 5/1966 | Christenson et al. | 260—18 |
| 3,258,437 | 6/1966 | Peters et al. | 260—22 |

DONALD E. CZAJA, *Primary Examiner.*

R. A. WHITE, *Assistant Examiner.*

U.S. Cl. X.R.

260—23, 27, 29.6, 29.7